United States Patent
Kasai

(10) Patent No.: US 6,172,302 B1
(45) Date of Patent: Jan. 9, 2001

(54) HARNESS COVER FOR ELECTRICAL CONNECTION BOX AND ASSEMBLY HAVING THE SAME

(75) Inventor: Koji Kasai, Yokkaichi (JP)

(73) Assignee: Sumitomo Wiring Systems, Ltd., Mie (JP)

(*) Notice: Under 35 U.S.C. 154(b), the term of this patent shall be extended for 0 days.

(21) Appl. No.: 09/232,810

(22) Filed: Jan. 19, 1999

(30) Foreign Application Priority Data

Jan. 26, 1998 (JP) .................................................. 10-012656

(51) Int. Cl.$^7$ ...................................................... H02G 3/14
(52) U.S. Cl. .......................... 174/67; 174/52.1; 220/242; 361/641; 439/144; 439/718
(58) Field of Search ................ 174/67, 52.1, 66, 174/135, 72 R; 220/242, 241; 439/135, 144, 147, 718; 361/641

(56) References Cited

U.S. PATENT DOCUMENTS

| | | | |
|---|---|---|---|
| 4,017,137 | * 4/1977 | Parks | 439/135 |
| 5,315,062 | * 5/1994 | Hoshino | 174/52.1 |
| 5,735,713 | * 4/1998 | Sugiura | 439/638 |
| 5,788,530 | * 8/1998 | Kasai | 439/372 |
| 5,817,976 | * 10/1998 | Yanase et al. | 174/52.1 |
| 5,998,735 | * 12/1999 | Patterson, Jr. | 174/67 |
| 6,010,351 | * 1/2000 | Kuboto | 439/347 |

FOREIGN PATENT DOCUMENTS 7-9021  2/1995  (JP) .

* cited by examiner

*Primary Examiner*—Kristine Kincaid
*Assistant Examiner*—Dhiru R. Patel
(74) *Attorney, Agent, or Firm*—Oliff & Berridge, PLC

(57) ABSTRACT

A harness cover is provided that covers end connectors of a group of wire harnesses installed on a body of an electrical connection box. When the harness cover is installed on the body, the wire harnesses are protected by the ceiling plate and prevented from curving upwardly. Further, the extension directions of the wire harnesses are restricted. After the electrical connection box and unconnected wire harnesses are delivered to a vehicle maker, an operation of connecting the unconnected wire harnesses with the body is performed. At this time, receiving portions for the end connectors of the unconnected wire harnesses are not covered by the harness cover so that they are easily found by an operator. Thus, it is possible to connect the unconnected wire harnesses with the electrical connection box easily and reliably.

9 Claims, 4 Drawing Sheets

HARNESS COVER FOR ELECTRICAL CONNECTION BOX AND ASSEMBLY HAVING THE SAME

BACKGROUND OF THE INVENTION

1. Field of Invention

The present invention relates to a harness cover for an electrical connection box such as a fuse box, a relay box or a junction box, particularly such a box installed in a vehicle, and also relates to an assembly of the electrical connection box, wire harnesses and the harness cover.

2. Description of Related Art

An electrical connection box may be used in a vehicle to accommodate various kinds of electric circuits and electronic parts and also to serve as a branch point or junction of wire harnesses and the like. Wire harnesses connected with the electrical connection box in a vehicle may include those at a cowl side (i.e., the interior side) and those at an engine room side. After the wire harnesses are connected with the electrical connection box, a harness cover covering the wire harnesses may be installed on the electrical connection box to protect the wire harnesses and prevent the wire harnesses from curving upward or in any other undesired directions. Japanese Utility Model Unexamined Publication No. 7-9021, the subject matter of which is incorporated herein by reference, describes such a harness cover.

Generally, the manner of connecting the wire harnesses at the cowl side and those at the engine room side with the electrical connection box in a right-hand drive vehicle is different from the manner of connection with the electrical connection box in a left-hand drive vehicle. In right-hand drive vehicles, connection of all the wire harnesses with the electrical connection box is performed by a harness maker, whereas in left-hand drive vehicles, connection of some wire harnesses with the electrical connection box may be performed by a vehicle maker.

When the harness maker connects the wire harnesses with the electrical connection box, the harness cover is installed on the electrical connection box before delivering the box to the vehicle maker.

When the wire harness are partially connected with the electrical connection box by the vehicle maker, harness cover is installed on the box by the vehicle maker. Thus, the harness cover is delivered to the vehicle maker separately from the box. An operator on an assembly line of the vehicle maker connects the unconnected wire harnesses with the electrical connection box and classifies all the wire harnesses into those which should be accommodated in the harness cover and those which should not be accommodated therein before installing the harness cover on the electrical connection box.

However, when the electrical connection box and the unconnected wire harnesses are delivered to the vehicle maker, the packing causes the wire harnesses to curve in undesirable directions. It is not easy thereafter to change the curvature directions of the wire harnesses to the operator's intended direction. Further, it is difficult for the operator to connect the unconnected wire harnesses with the electrical connection box because those connected with the box interfere with the operation of connecting the unconnected wire harnesses with the box. Thus, it is very difficult for the operator to classify all the wire harnesses into those which should be accommodated in the harness cover and those which should not be accommodated therein and to install the harness cover on the box within a limited period of time.

Moreover, the operator has to adopt an uncomfortable posture while performing the wire connection operation and the harness covering-installing operation along the assembly line which may cause the harness cover to be defectively engaged on the electric connection box or the harness cover to be damaged or broken.

SUMMARY OF THE INVENTION

The present invention aims to solve the above-described problems. It is an object of the present invention to provide an arrangement of a harness cover and an electric connection box. The harness cover may be installed on the electric connection box with high operational efficiency and operation quality.

According to the present invention, a harness cover of an electrical connection box may be provided for covering end connectors of a plurality of wire harnesses that are connected to the electrical connection box. A ceiling plate and a pair of mutually opposed plate-shaped leg portions extending from opposite side edges of the ceiling plate may be detachably connected to the electrical connection box. When the harness cover is mounted on the electrical connection box by the leg portions, the ceiling plate covers the end connectors of the harnesses and the leg portions form opposed barriers at opposite sides of the harness cover restricting the directions in which the wire harnesses lie.

According to the present invention, an assembly may be provided including an electrical connection box having wire harness end connector receiving elements on one side and wire harnesses having respective end connectors received in the wire harness end connector receiving elements. A harness cover may be mounted on the electrical connection box and have a ceiling plate which overlies and covers the end connectors of a first group of the wire harnesses while leaving the end connectors exposed of a second group of the wire harnesses.

The shape of the harness cover of the present invention may be adapted to provide the desired coverage of the end connectors of the harnesses on the electrical connection box. The plate-shaped leg portions at opposite sides can provide good guidance of the wire harnesses, and also good connection to the electrical connection box.

Other objects, advantages and salient features of the invention will become apparent from the following detailed description taken in conjunction with the annexed drawings, which disclose preferred embodiments of the invention.

BRIEF DESCRIPTION OF THE DRAWINGS

Embodiments of the invention will now be described by way of non-limiting examples with reference to the accompanying drawings in which like reference numerals refer to like elements and wherein.

DETAILED DESCRIPTION OF PREFERRED EMBODIMENTS

Figure 1:
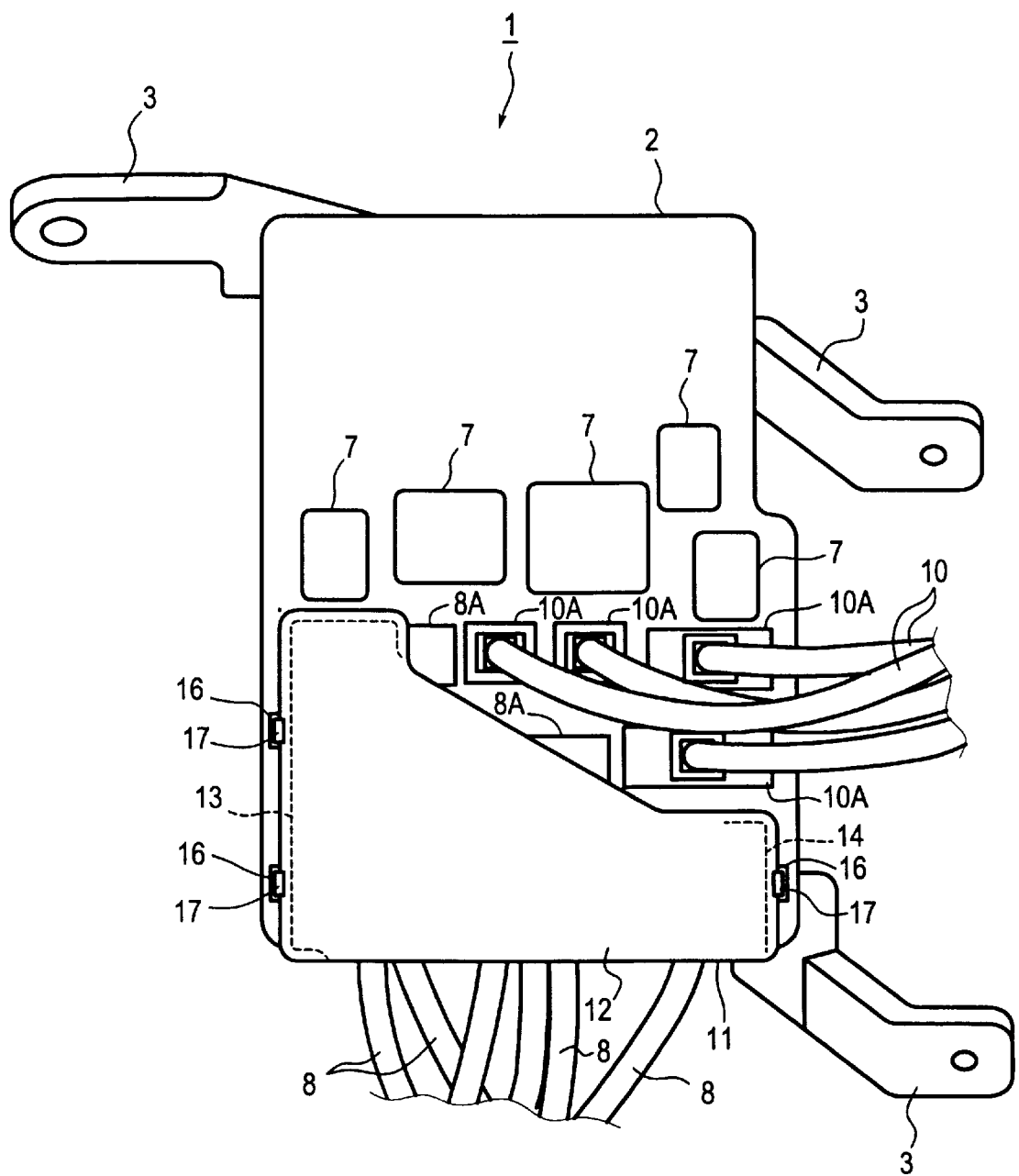
FIG. 1 is a rear view of an electrical connection box in an assembly according the present invention.
Figure 2:
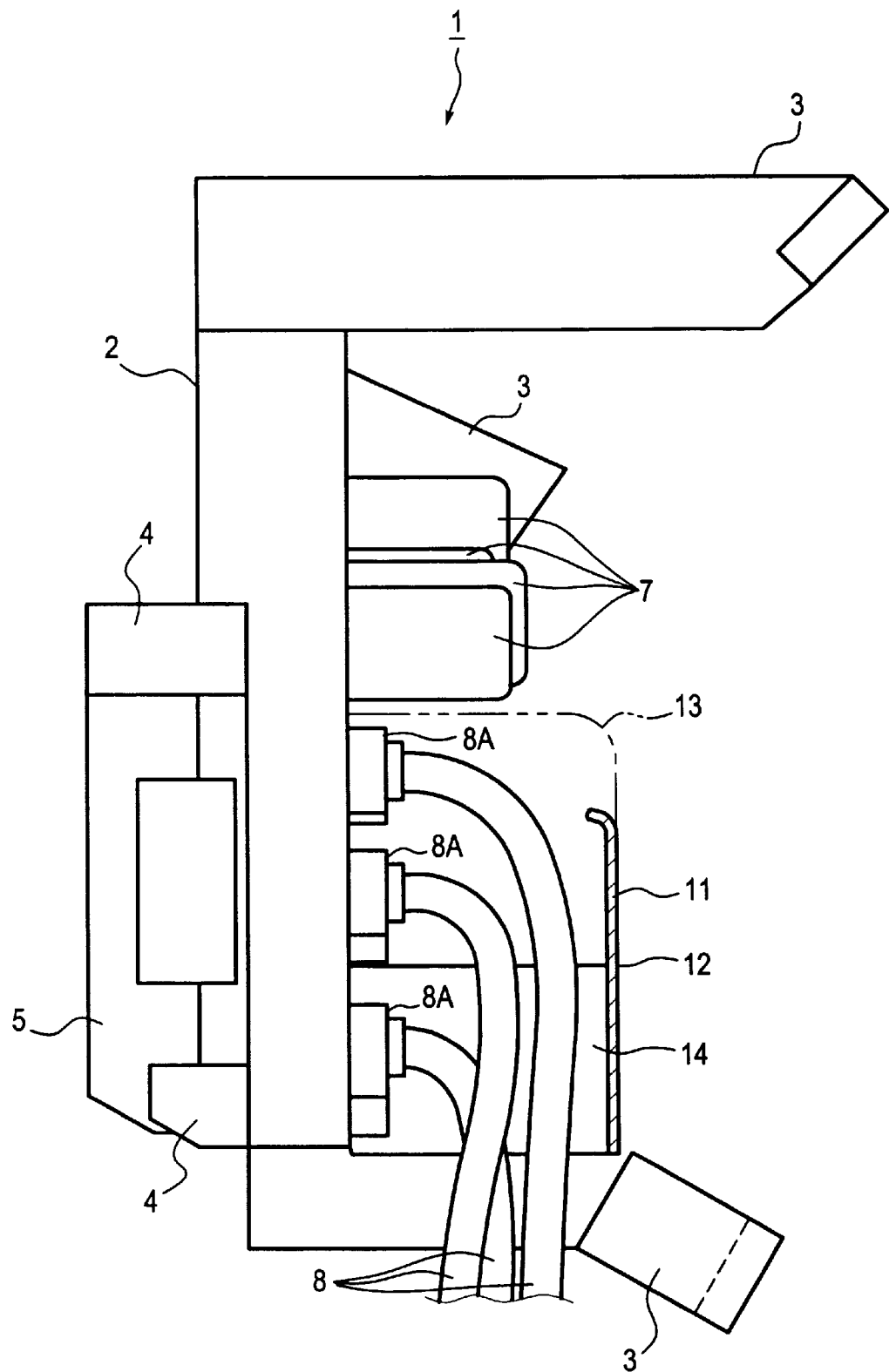
FIG. 2 is a side view of the electrical connection box shown in FIG. 1.

FIGS. 1 and 2 show the electrical connection box 1, which is part of an assembly according to the present invention together with a harness cover 11 and wire harnesses 8, 10. The electrical connection box 1 includes a body 2 and a circuit unit 5. An installing leg 3 is provided at a plurality of corners of the body 2 and extends over the rear surface of the electrical connection box 1. This is used to install the electrical connection box 1 inside a cowl of the vehicle.

The body 2 accommodates electrical circuits (not shown) composed of bus bars, electric wires, and the like. A plurality of guide walls 4 are formed on the front surface of the body 2. The circuit unit 5 is fixedly accommodated in the guide walls 4 and includes a substrate on which electronic component parts such as a control integrated circuit are mounted.

Figure 4:
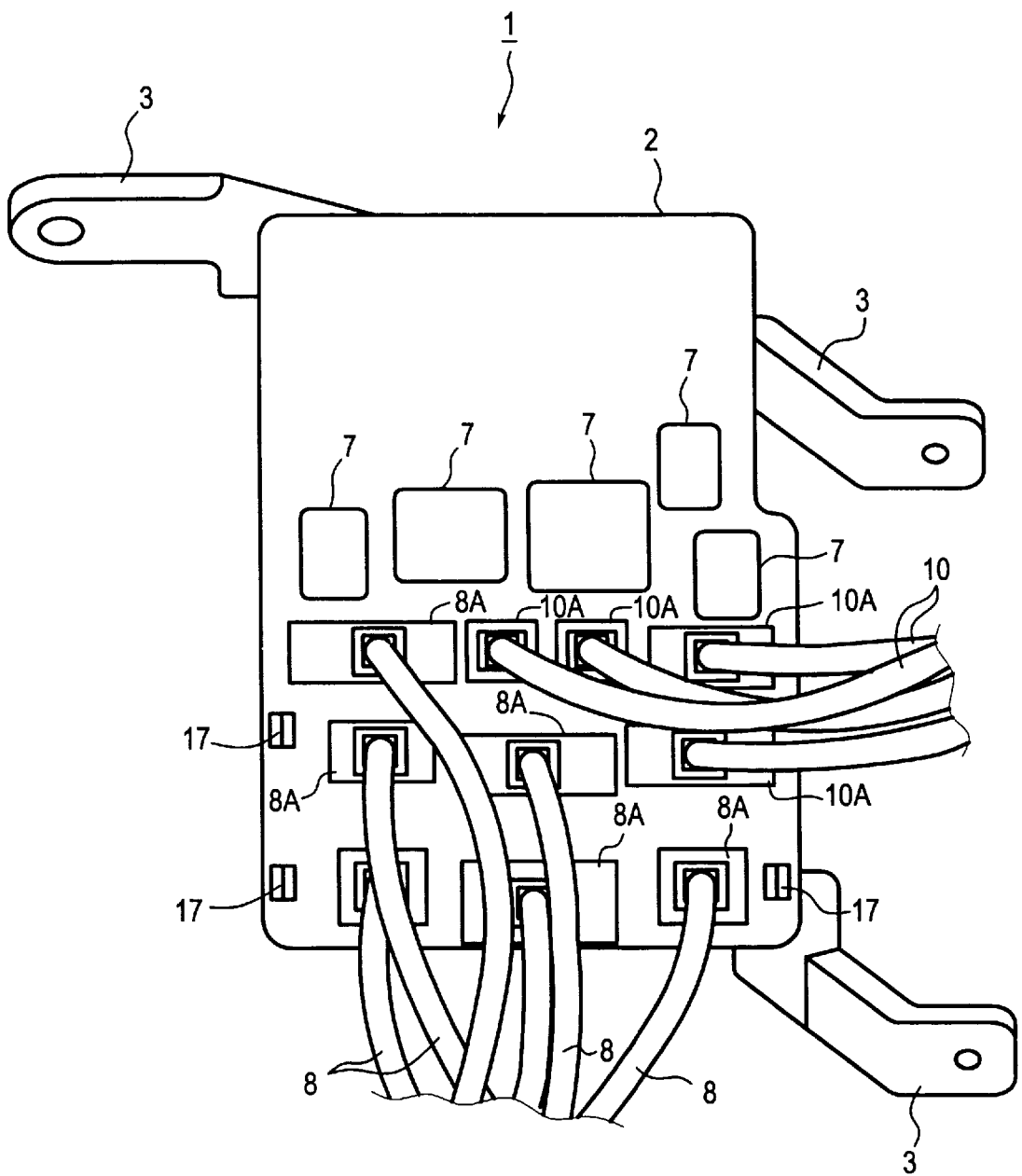
FIG. 4 is a rear view showing the electrical connection box of FIG. 1 from which the harness cover has been removed.

As shown in FIG. 4, a plurality of electronic component parts 7 such as relays and the like are installed on the rear surface of the body 2. Connectors 8A are formed at ends of the wire harnesses 8 located on the cowl side. Similarly, connectors 10A are formed at ends of the wire harnesses 10 located on the engine room side. The connectors 8A and 10A are located alongside the electronic component parts 7 and are fitted into reception portions at the rear surface of the body 2. The connectors 8A are adjacent to one another such that they make a group. Similarly, the connectors 10A are also proximate to one another such that they make a second group.

As shown in FIGS. 1 and 2, the harness cover 11 is made of synthetic resin and covers the connectors 8A of all the wire harnesses 8. The harness cover 11 is installed on the rear surface of the body 2. The harness cover 11 includes a flat planar sheet ceiling plate 12 for protecting all the wire harnesses 8 connected with the body 2 and flat planar sheet leg portions 13 and 14 forming a pair of opposed sides of the ceiling plate 12. The flat planar sheet leg portions 13 and 14 are perpendicular to the plane of the ceiling plate 12. Open gaps are provided at the other pair of opposed sides of the ceiling plate 12 perpendicular to the leg portions 13 and 14.

Figure 3:
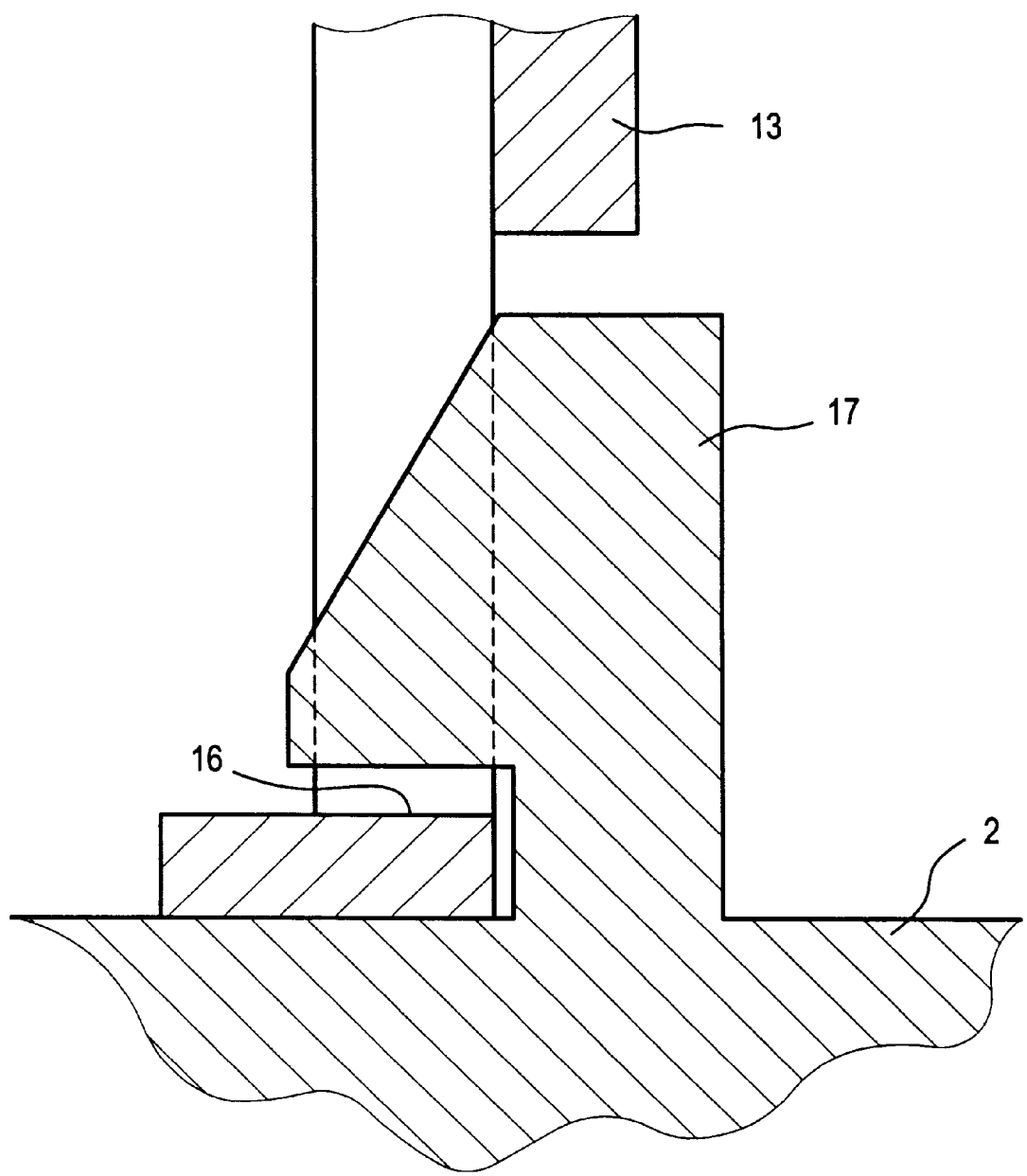
FIG. 3 is an enlarged sectional view showing an engaging portion of a harness cover on the electrical connection box of FIG. 1.

As shown in FIGS. 1 and 3, a pair of engaging portions 16 are formed on the leg portion 13 and are spaced at a certain interval. Similarly, a single engaging portion 16 is formed on the leg portion 14. Three hook-shaped engaging projections 17 each corresponding to the engaging portion 16 of the leg portions 13 and 14 are formed on the rear surface of the body 2. The harness cover 11 is installed on the body 2 using the engagement between the engaging portions 16 of the leg portions 13 and 14 and the engaging projections 17 of the body 2.

The ceiling plate 12 is shaped to cover the connectors 8A of all the wire harnesses 8 that should be protected. That is, because the connectors 8A are positioned next to one another to form a group, the shape of the ceiling plate 12 can be simple. In one embodiment, the shape of the ceiling plate 12 is approximately trapezoidal although other shapes are also within the scope of the present invention.

Accordingly, when the harness cover 11 is installed on the body 2, the wire harnesses 8 are protected by the ceiling plate 12 and leg portions 13, 14 and are prevented from extending and curving upwardly. Thus, the extension direction of the wire harnesses 8 is restricted.

On the assembly line of a harness maker, the circuit unit 5 and the electronic component parts 7 are installed on the body 2 of the electrical connection box 1 having the above-described construction. Then, as shown in FIG. 4, the wire harnesses 8 are connected with the body 2 by fitting the connectors 8A of the wire harnesses 8 located at the cowl side into the reception portions of the body 2. The harness cover 11 is installed on the body 2 with all the wire harnesses 8 extending downward through one side opening of the harness cover 11 at a lower part thereof.

Then, the body 2 to which the wire harnesses 8 have been connected and a plurality of wire harnesses 10 which are to be connected with the electrical connection box at the engine room side are delivered to the vehicle manufacturer.

On an assembly line of the vehicle maker, after the connectors 10A of the wire harnesses 10 which are to be connected with the electric connection box at the engine room side are fitted into the corresponding reception portions of the body 2, the installing legs 3 are fixed to a portion of the cowl of the vehicle with bolts so as to install the electrical connection box 1 inside the cowl of the vehicle.

In this embodiment, the harness cover 11 covering the connectors 8A of all the wire harnesses 8 which should be protected and connected with the electrical connection box 1 is installed on the body 2. Thus, when the harness cover 11 is installed on the electrical connection box 1, the wire harnesses 8 are protected by the harness cover 11 and are prevented from curving upwardly and the extension directions of the wire harnesses 8 are restricted so that the wire harnesses 8 are not located over the reception portions in which the connectors 10A of the wire harnesses 10 are fitted.

Accordingly, the wire harnesses 8 are not an obstacle in connecting the wire harnesses 10 with the electrical connection box 1 at the engine room side after the box 1 connected with the wire harnesses 8 and the harness cover 11 are delivered to the vehicle maker. Further, the connectors 8A of the wire harnesses 8 are covered by the harness cover 11; however, the reception portions for the connectors 10A are not covered by the harness cover 11 and can be easily found by an operator. Thus the operator may connect the wire harnesses 10 with the electrical connection box 1 easily and reliably on the assembly line within a limited period of time. Therefore, connection of the wire harnesses 10 to the electrical connection box 1 may be performed with high efficiency and quality.

Because the harness cover 11 is already installed on the electrical connection box 1, it is unnecessary to connect the harness cover 11 to the box 1 at the vehicle maker. Thus, the harness cover 11 may be prevented from being defectively installed on the box 1 or being damaged or broken.

In this embodiment, the connectors 8A of all the wire harnesses 8 which should be protected by the harness cover 11 are near one another to form a group. Thus, the shape of the ceiling plate 12 of the harness cover 11 can be simple and therefore the mechanical strength of the wire harness 11 may be improved.

In this embodiment, the body 2 and the harness cover 11 are connected with each other by the engagement between the engaging projections 17 of the body 2 and the engaging portions 16 of the leg portions 13 and 14 of the harness cover 11. Thus it is possible to install the harness cover 11 on the electrical connection box 1 and remove the former from the latter easily and reliably.

The engaging projections 17 are formed on the body 2 and the engaging portions 16 are formed on the leg portions 13 and 14 of the harness cover 11. However, the engaging projections 17 may be formed on the leg portions 13 and 14 and the engaging portions 16 may be formed on the body 2.

While the invention has been described in relation to preferred embodiments, many modifications and variations are apparent from the description of the invention, and all such modifications and variations are intended to be within the scope of the present invention as defined in the appended claims.

What is claimed is:

1. An assembly comprising:

an electrical connection box having a plurality of wire harness end connector receiving elements on one side;

a plurality of wire harnesses having respective end connectors received in said wire harness end connector receiving elements, said plurality of wire harnesses including a first group and a second group; and a harness cover mounted on said electrical connection box and having a ceiling plate which covers said end connectors of the first group of said plurality of wire harnesses while leaving said end connectors of the second group of said plurality of wire harnesses exposed.

2. The assembly of claim 1, wherein said harness cover has a pair of leg portions extending from opposite side edges of said ceiling plate toward said electrical connection box, the harness cover being detachably connected to said electrical connection box, said leg portions supporting said ceiling plate and providing opposed barriers at opposite sides of said harness cover to restrict directions in which said first group of said plurality of wire harnesses lie.

3. The assembly of claim 2, wherein said leg portions and said ceiling plate define an open gap between said ceiling plate and said electrical connection box at one of said side edges of said ceiling plate, and said first group of said plurality of wire harnesses passes through said open gap.

4. The assembly of claim 1, wherein the harness cover is installed in a vehicle.

5. An assembly comprising:

an electrical connection box having a plurality of wire harness receiving elements;

a plurality of wire harnesses having end connectors respectively received in the wire harness receiving elements; and a harness cover provided over said electrical connection box to cover a first group of the plurality of wire harnesses while not covering a second group of the plurality of wire harnesses.

6. The assembly of claim 5, wherein the harness cover includes a ceiling plate.

7. The assembly of claim 6, wherein said harness cover has a pair of leg portions extending from opposite side edges of said ceiling plate toward said electrical connection box, the harness cover being detachably connected to said electrical connection box, said leg portions supporting said ceiling plate and providing opposed barriers at opposite sides of said harness cover to restrict directions in which said first group of said plurality of wire harnesses lie.

8. The assembly of claim 7, wherein said leg portions and said ceiling plate define an open gap between said ceiling plate and said electrical connection box at one of said side edges of said ceiling plate, and said first group of said plurality of wire harnesses passes through said open gap.

9. The assembly of claim 5, wherein the harness cover is installed in a vehicle.

* * * * *